United States Patent
Nakano et al.

(10) Patent No.: US 7,675,266 B2
(45) Date of Patent: Mar. 9, 2010

(54) BATTERY PACK

(75) Inventors: Itsuki Nakano, Atsugi (JP); Akira Ikeuchi, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 374 days.

(21) Appl. No.: 11/706,485

(22) Filed: Feb. 12, 2007

(65) Prior Publication Data

US 2007/0188133 A1    Aug. 16, 2007

(30) Foreign Application Priority Data

Feb. 13, 2006  (JP)  .............................. 2006-035594
Jan. 31, 2007  (JP)  .............................. 2007-022196

(51) Int. Cl.
*H02J 7/00* (2006.01)

(52) U.S. Cl. ........................ 320/132; 320/106; 320/134; 320/136; 320/162; 324/432; 324/435

(58) Field of Classification Search .................. 320/132, 320/134, 135, 149; 324/472, 428, 432
See application file for complete search history.

(56) References Cited

U.S. PATENT DOCUMENTS

| 5,278,487 | A | * | 1/1994 | Koenck | 320/132 |
| 5,311,181 | A | * | 5/1994 | Ferguson et al. | 341/143 |
| 5,656,915 | A | * | 8/1997 | Eaves | 320/118 |
| 5,768,316 | A | * | 6/1998 | Sogo | 375/260 |
| 6,312,393 | B1 | * | 11/2001 | Abreu | 600/558 |
| 6,374,379 | B1 | * | 4/2002 | Walker et al. | 714/724 |
| 7,324,029 | B2 | * | 1/2008 | Wang | 341/143 |
| 2005/0231206 | A1 | * | 10/2005 | Denning | 324/430 |
| 2006/0087286 | A1 | * | 4/2006 | Phillips et al. | 320/114 |
| 2007/0188133 | A1 | * | 8/2007 | Nakano et al. | 320/112 |
| 2007/0188146 | A1 | * | 8/2007 | Nakano et al. | 320/132 |

FOREIGN PATENT DOCUMENTS

| JP | 2001-102925 | 4/2001 |
| JP | 2001-174534 | 6/2001 |
| JP | 2003-204267 | 7/2003 |

\* cited by examiner

*Primary Examiner*—Edward Tso
*Assistant Examiner*—Arun Williams
(74) *Attorney, Agent, or Firm*—Ladas & Parry LLP (57) ABSTRACT

A battery pack is disclosed. The battery pack includes a battery; a current detecting unit which detects charging and discharging currents of the battery and outputs an analog signal corresponding to the charging and discharging currents; a modulating unit which modulates the analog signal to be a PDM (pulse density modulation) signal by applying a PDM modulation to the analog signal; a memory in which a conversion program for converting the PDM signal into PCM (pulse code modulation) data and a remaining battery charge calculating program for calculating a remaining battery charge by accumulating the PCM data are stored; and a CPU, which converts the PDM signal into the PCM data which are digital data by being supplied the PDM signal from the modulating unit while executing the conversion program stored in the memory, and calculates the remaining battery charge by accumulating the PCM data while executing the remaining battery charge calculating program stored in the memory.

5 Claims, 12 Drawing Sheets

BATTERY PACK

BACKGROUND OF THE INVENTION

1. Field of the Invention

The present invention relates to a battery pack which measures a remaining battery charge.

2. Description of the Related Art

Recently, lithium-ion batteries have been loaded in mobile devices, for example, a digital still camera. In the lithium-ion battery, generally, it may be difficult to detect a remaining battery charge by its voltage. In order to detect the remaining battery charge of the battery, there is a method in which charging and discharging currents in the battery are accumulated (refer to Patent Document 1).

Since a current is consumed even if the lithium-ion battery is detached from the mobile device, a user needs a detector that detects the remaining battery charge by accumulating the charging and discharging currents of the lithium-ion battery, a regulator/protection circuit, and so on which are contained in a case as a battery pack.

In the detector, analog signals such as current values are converted into PCM (pulse code modulation) data which are digital values formed of multi bits, and the PCM data are accumulated. Consequently, an analog-to-digital converter is required to convert detected charging and discharging currents of the lithium-ion battery into the PCM data (refer to Patent Documents 2 and 3).

[Patent Document 1] Japanese Laid-Open Patent Application No. 2001-174534

[Patent Document 2] Japanese Laid-Open Patent Application No. 2001-102925

[Patent Document 3] Japanese Laid-Open Patent Application No. 2003-204267

Recently, the battery pack has been required to be small sized corresponding to the miniaturization of the mobile device. However, the circuit size of an analog-to-digital converter is large; therefore, it is difficult to install the detector in a small sized battery pack.

SUMMARY OF THE INVENTION

The present invention provides a battery pack of a small size which can detect a remaining battery charge of a battery.

According to one aspect of the present invention, there is provided a battery pack. The battery pack includes a battery; a current detecting unit which detects charging and discharging currents of the battery and outputs an analog signal corresponding to the charging and discharging currents; a modulating unit which modulates the analog signal to be a PDM (pulse density modulation) signal by applying a PDM modulation to the analog signal; a memory in which a conversion program for converting the PDM signal into PCM (pulse code modulation) data and a remaining battery charge calculating program for calculating a remaining battery charge by accumulating the PCM data are stored; and a CPU, which converts the PDM signal into the PCM data which are digital data by being supplied the PDM signal from the modulating unit while executing the conversion program stored in the memory, and calculates the remaining battery charge by accumulating the PCM data while executing the remaining battery charge calculating program stored in the memory. With the above structure, a battery pack having a remaining battery charge function can be realized in a small size.

According to another aspect of the present invention, the CPU intermittently executes the conversion program, loads the PDM signal from the modulating unit, and converts the PDM signal into the PCM data.

According to another aspect of the present invention, the battery pack further includes a voltage detecting unit which detects a voltage of the battery; a temperature detecting unit which detect ambient temperature of the battery pack; and a selecting unit which selects one of analog signals detected from the current detecting unit, the voltage detecting unit, and the temperature detecting unit. The remaining battery charge calculating program corrects the remaining battery charge by using the PCM data of the voltage detected by the voltage detecting unit and the PCM data of the temperature detected by the temperature detecting unit when the remaining battery charge calculating program accumulates the PCM data of the charging and discharging currents.

According to another aspect of the present invention, the modulating unit is a sigma-delta modulator.

According to another aspect of the present invention, the current detecting unit, the modulating unit, the memory, and the CPU are integrated into one semiconductor integrated circuit.

According to an embodiment of the present invention, a battery pack of a small size which detects a remaining battery charge can be realized.

Other advantages and further features of the present invention will become apparent from the following detailed description when read in connection point with the accompanying drawings.

DETAILED DESCRIPTION OF THE PREFERRED EMBODIMENTS

Referring now to the drawings, embodiments of the present invention are described.

First Embodiment

Figure 1:
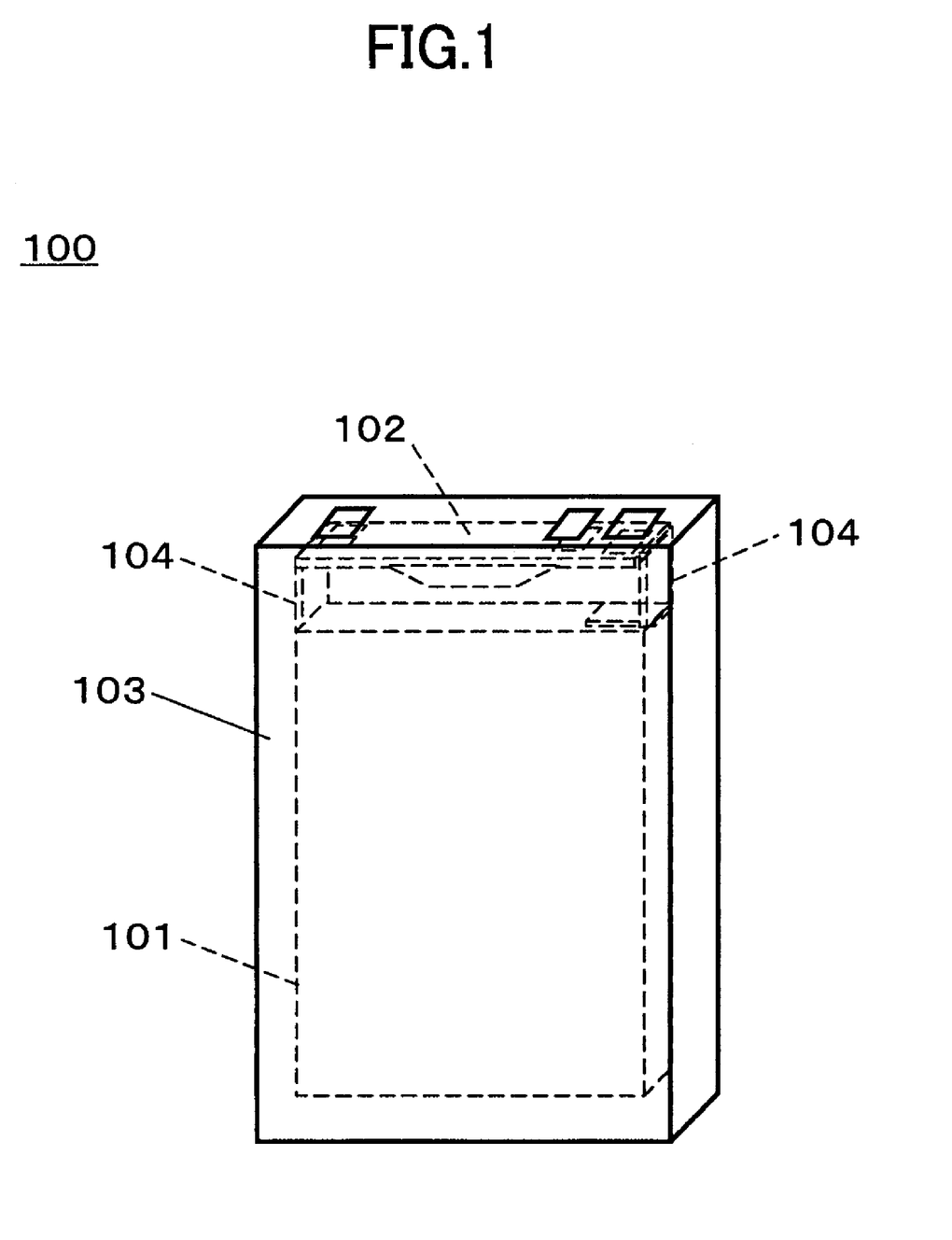
FIG. 1 is a perspective view of a battery pack according to a first embodiment of the present invention.
Figure 2:
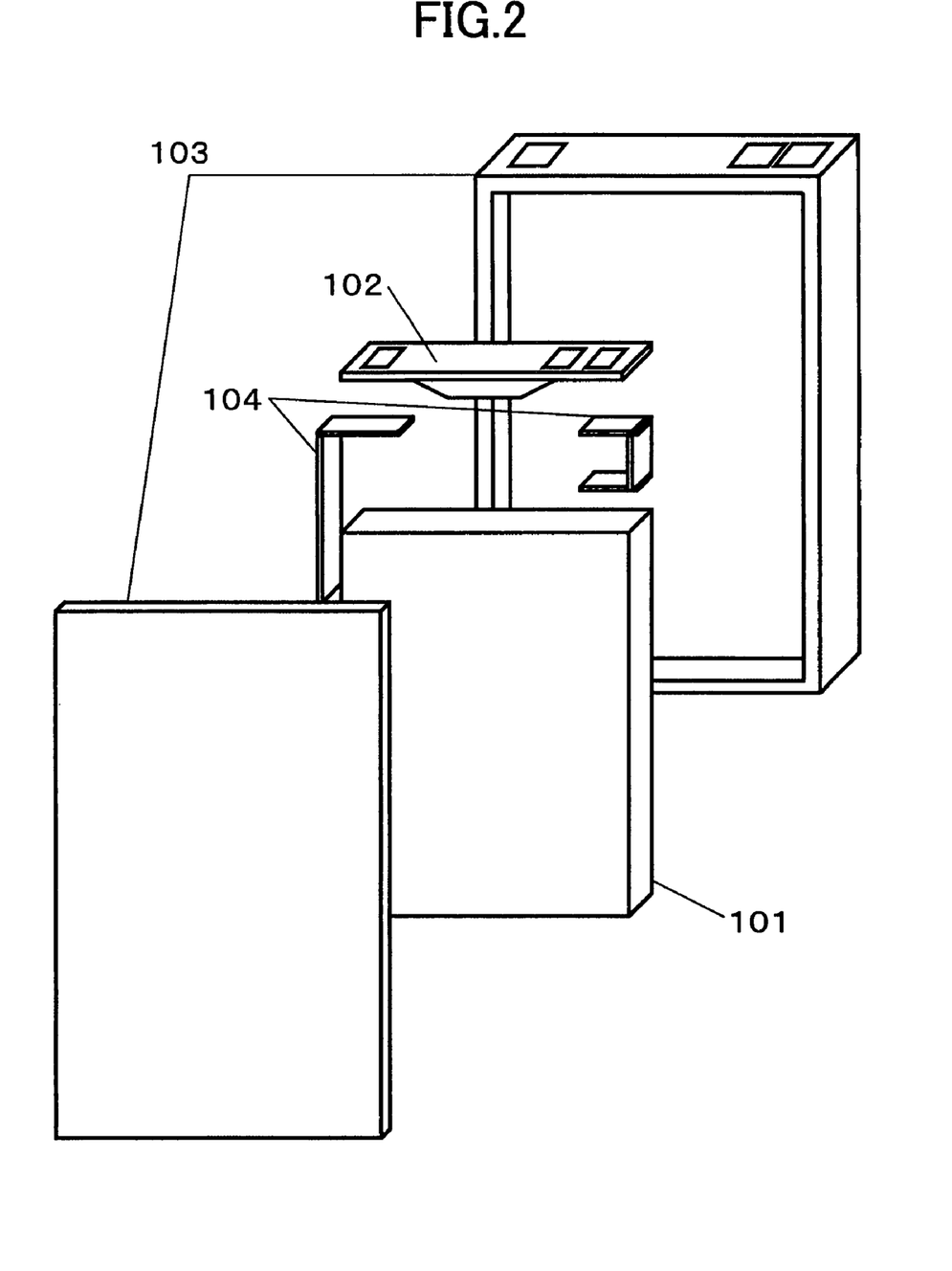
FIG. 2 is an exploded perspective view of the battery pack shown in FIG. 1.

FIG. 1 is a perspective view of a battery pack according to a first embodiment of the present invention. FIG. 2 is an exploded perspective view of the battery pack shown in FIG. 1.

As shown in FIGS. 1 and 2, in a battery pack 100, a battery 101 and a circuit board 102 are contained in a case 103. The battery 101 is, for example, a lithium-ion battery and is connected to the circuit board 102 via connecting terminals 104.

Figure 3:
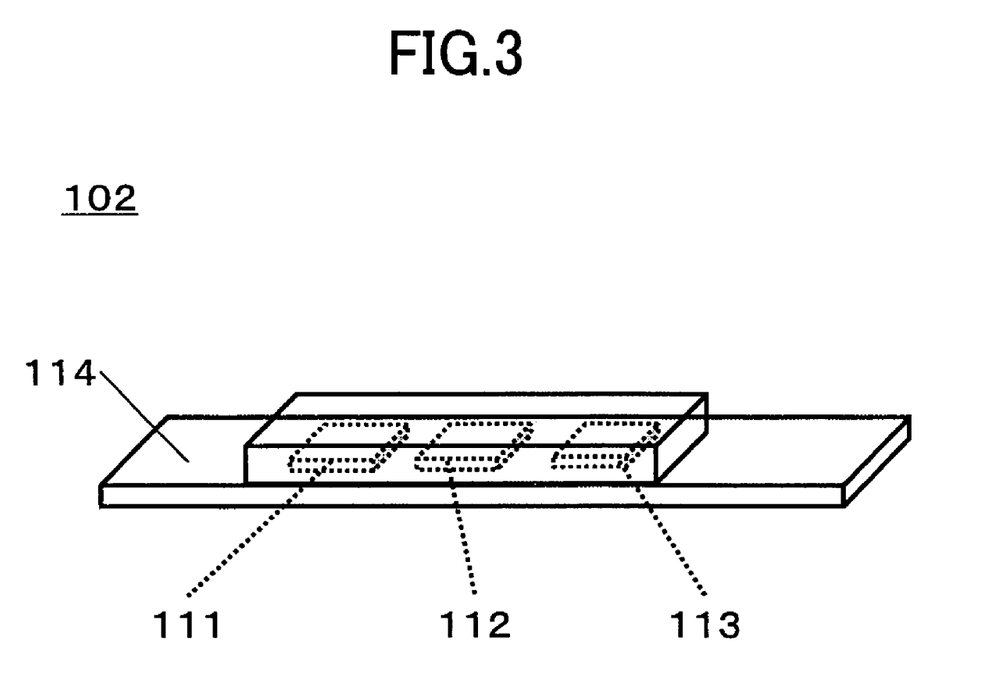
FIG. 3 is a perspective view of a circuit board shown in FIG. 1.

FIG. 3 is a perspective view of the circuit board 102. As shown in FIG. 3, in the circuit board 102, a fuel gauge IC 111, a regulator/protection circuit 112, a transistor 113, and a current detecting resistor Rs (refer to FIG. 4) are mounted on a printed circuit board 114 having a two-layer or a multi-layer structure.

The fuel gauge IC 111 detects the remaining battery charge of the battery 101 by accumulating charging and discharging currents of the battery 101. The remaining battery charge detected by the fuel gauge IC 111 is output to an external mobile device (not shown).

Figure 4:
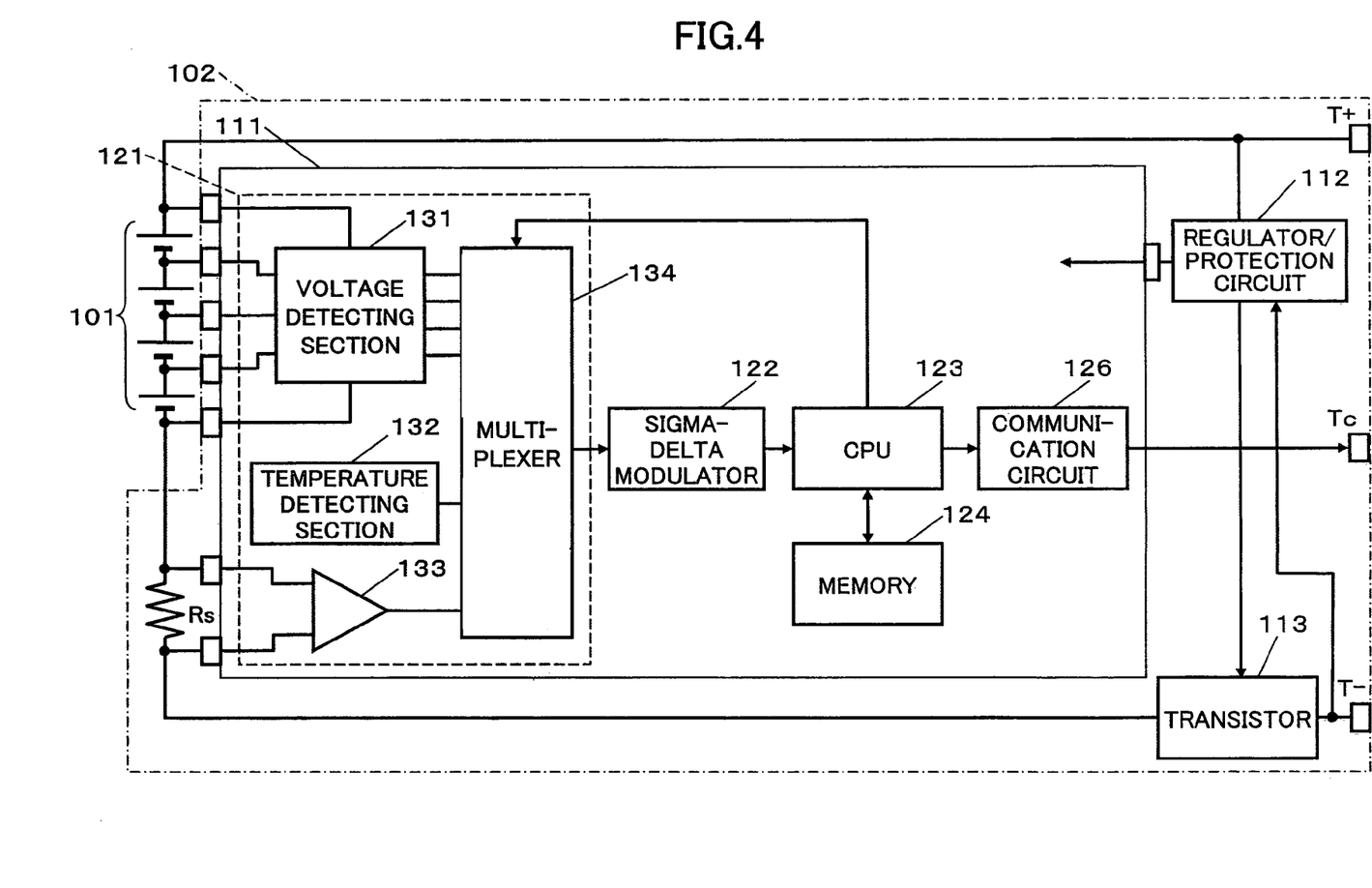
FIG. 4 is a block diagram showing a fuel gauge IC according to the first embodiment of the present invention.

The regulator/protection circuit 112 detects an overcharge, an overdischarge, an overcurrent, a short circuit, and so on by detecting a voltage of the battery 101 and by detecting a current flowing into a terminal T− (refer to FIG. 4). Further, the regulator/protection circuit 112 cuts off the terminal T− from a load by controlling the transistor 113 while using the detected result. With this, the battery 101 and the load connected to terminals T+ (refer to FIG. 4) and T− are protected. In addition, the regulator/protection circuit 112 stabilizes and supplies a power source obtained from the battery 101 to the fuel gauge IC 111 which is a detector for detecting the remaining battery charge of the battery 101.

FIG. 4 is a block diagram showing the fuel gauge IC 111.

The fuel gauge IC 111 is, for example, a one-chip IC and includes a detecting section 121, a sigma-delta modulator 122, a CPU 123, a memory 124, and a communication circuit 126.

The detecting circuit 121 includes a voltage detecting section 131, a temperature detecting section 132, a current detecting section 133, and a multiplexer 134.

The voltage detecting section 131 is connected to both terminals of the battery 101 and detects a voltage of the battery 101. The detected voltage is supplied to the multiplexer 134. The temperature detecting section 132 detects ambient temperature and generates a temperature signal corresponding to the detected ambient temperature and outputs the temperature signal. The temperature signal from the temperature detecting section 132 is supplied to the multiplexer 134.

The current detecting section 133 is, for example, a differential amplifier, and is connected to both ends of the current detecting resistor Rs connected between the battery 101 and the terminal T− via the transistor 113. With this, the current detecting section 133 detects a voltage between the ends of the current detecting resistor Rs which voltage is generated by a current flowing through the current detecting resistor Rs, and outputs a voltage signal corresponding to charging and discharging currents of the battery 101. That is, the current detecting section 133 detects a current flowing in the current detecting resistor Rs from a potential difference between the ends of the current detecting resistor Rs.

The voltage is, for example, a reference voltage V0 when the charging or discharging current does not flow, a voltage more than the voltage V0 when the charging current flows, and a voltage less than the voltage V0 when the discharging current flows. The voltage signal is input to the multiplexer 134. The signal detected from the current detecting section 133 is supplied to the multiplexer 134.

The multiplexer 134 selects any one of the signals from the voltage detecting section 131, the temperature detecting section 132, and the current detecting section 133 based on a control signal from the CPU 123, and supplies the selected signal to the sigma-delta modulator 122.

The sigma-delta modulator 122 applies a PDM (pulse density modulation), that is, a one-bit digital modulation to the analog signal selected from the multiplexer 134 and supplies the modulated signal (PDM signal) to the CPU 123.

The CPU 123 converts the PDM signal into multi-bit digital data, that is, PCM data by executing a digital filter processing program 147 (refer to FIG. 6) stored in the memory 124. In addition, the CPU 123 calculates the remaining battery charge in the battery 101 by using the PCM data while executing a remaining battery charge calculating program 148 (referred to FIG. 6) stored in the memory 124. The CPU 123 is, for example, a processor such as a microprocessor. The communication circuit 116 sends the remaining battery charge in the battery 101 calculated by the CPU 123 to an external circuit.

[Structure of Sigma-Delta Modulator 122]

Figure 5:
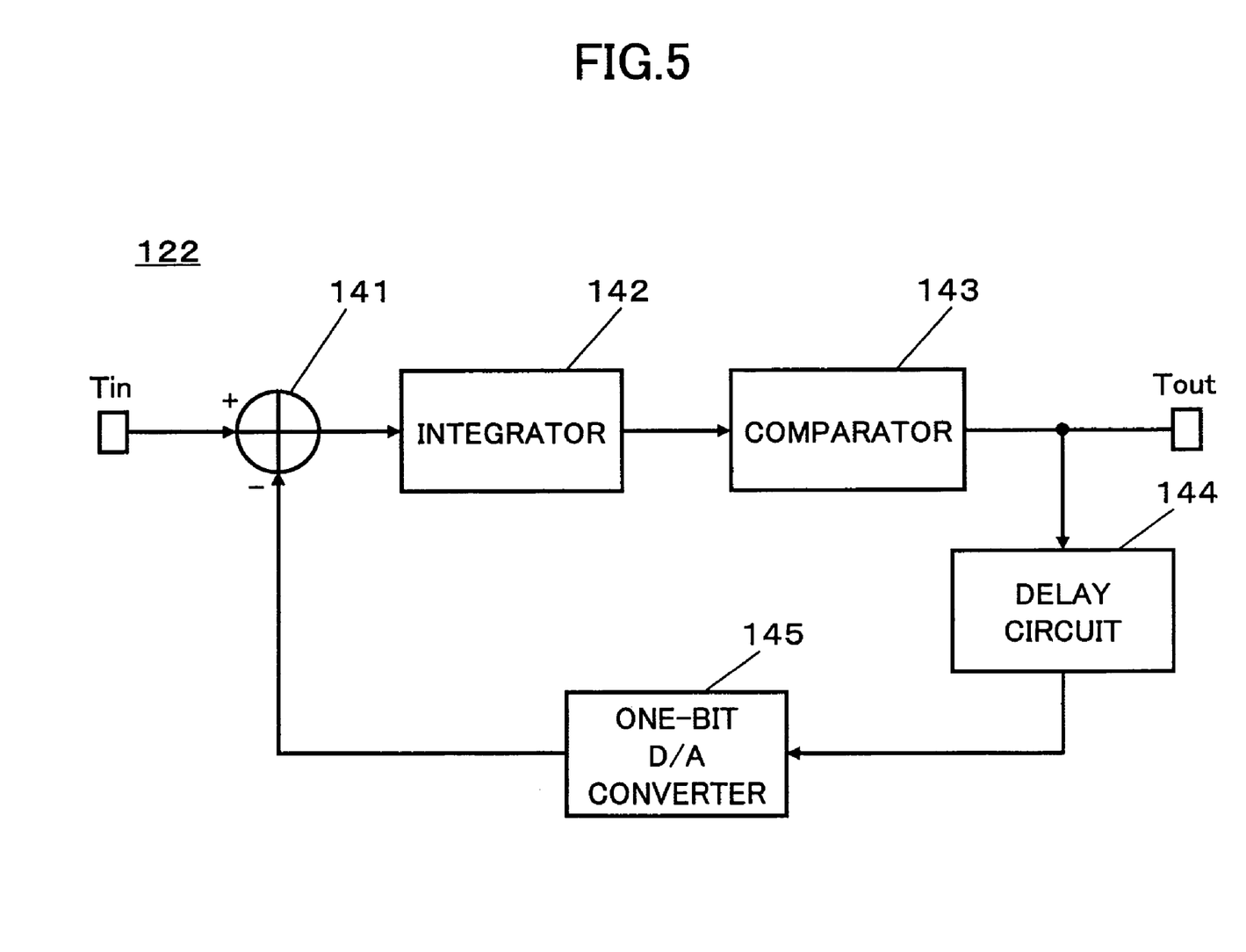
FIG. 5 is a block diagram showing a sigma-delta modulator shown in FIG. 4.

Next, the sigma-delta modulator 122 is described. FIG. 5 is a block diagram showing the sigma-delta modulator 122. The sigma-delta modulator 122 includes a subtractor 141, an integrator 142, a comparator 143, a delay circuit 144, and a one-bit D/A converter 145.

The subtractor 141 obtains a differential signal by subtracting a signal output from the one-bit D/A converter 145 from the analog signal supplied from the multiplexer 134, which analog signal is input to an input terminal Tin. The differential signal output from the subtractor 141 is supplied to the integrator 142.

The integrator 142 integrates the differential signals supplied from the subtractor 141. The integrated signal output from the integrator 142 is supplied to the comparator 143.

The comparator 143 compares the integrated signal with the reference voltage V0 set therein. When the integrated signal is larger than the reference voltage V0, the comparator 143 outputs a high level signal, and when the integrated signal is smaller than the reference voltage V0, the comparator 143 outputs a low level signal.

The signal from the comparator 143 is output from an output terminal Tout and also is supplied to the delay circuit 144. The delay circuit 144 delays the signal output from the comparator 143 by one sampling period and outputs the delayed signal.

The delayed signal is supplied to the one-bit D/A converter 145. The one-bit D/A converter 145 applies one-bit D/A conversion to the delayed signal and supplies the converted signal to the subtractor 141.

From the output terminal Tout of the sigma-delta modulator 122, the modulated signal (PDM signal) is output, that is, a signal is output in which one-bit digital modulation (PDM modulation) is applied to the analog signal output from the multiplexer 134.

The PDM signal output from the output terminal Tout is supplied to the CPU 123. The CPU 123 executes a program stored in the memory 124 for the PDM signal.

[Data in Memory 124]

Figure 6:
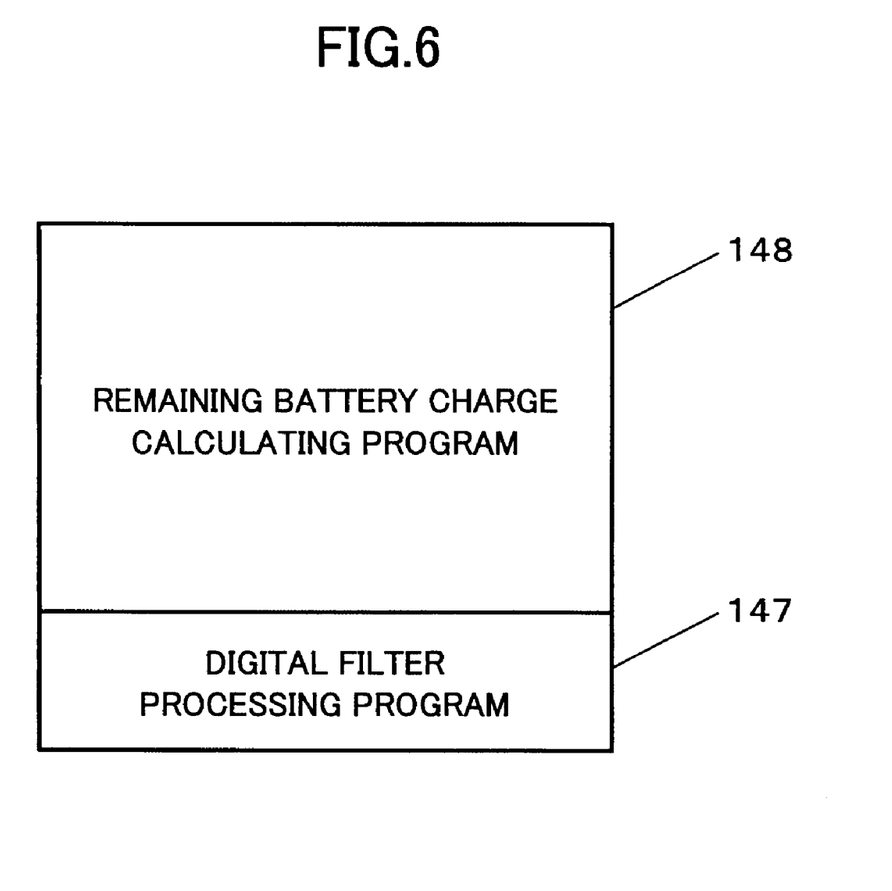
FIG. 6 is a diagram showing programs stored in a ROM of a memory shown in FIG. 4.

The memory 124 is formed of a storage medium having a relatively small capacity of approximately 2 KB, such as a ROM and a storage medium such as a RAM. Programs which are executed by the CPU 123 are stored in the ROM. FIG. 6 is a diagram showing programs stored in the ROM of the memory 124. As shown in FIG. 6, in the ROM, the digital filter processing program 147 and the remaining battery charge calculating program 148 are stored. The RAM is used as working storage and so on when the CPU 123 operates.

The digital filter processing program 147 applies a digital filter process to the PDM signal output from the sigma-delta modulator 122, that is, converts the PDM signal output from the sigma-delta modulator 122 into PCM data (multi-bit digital value). In other words, the digital filter processing program 147 executes, for example, a decimation filter process.

The decimation filter process includes a CIC (cascaded integrator-comb) filter process and a FIR (finite impulse response) filter process. Instead of the FIR filter process, an IIR (infinite impulse response) filter process can be used.

The remaining battery charge calculating program 148 calculates the remaining battery charge in the battery 101 by accumulating the PCM data converted by the digital filter processing program 147, and stores the calculated remaining battery charge in the memory 124.

[Processes in CPU 123]

Figure 7:
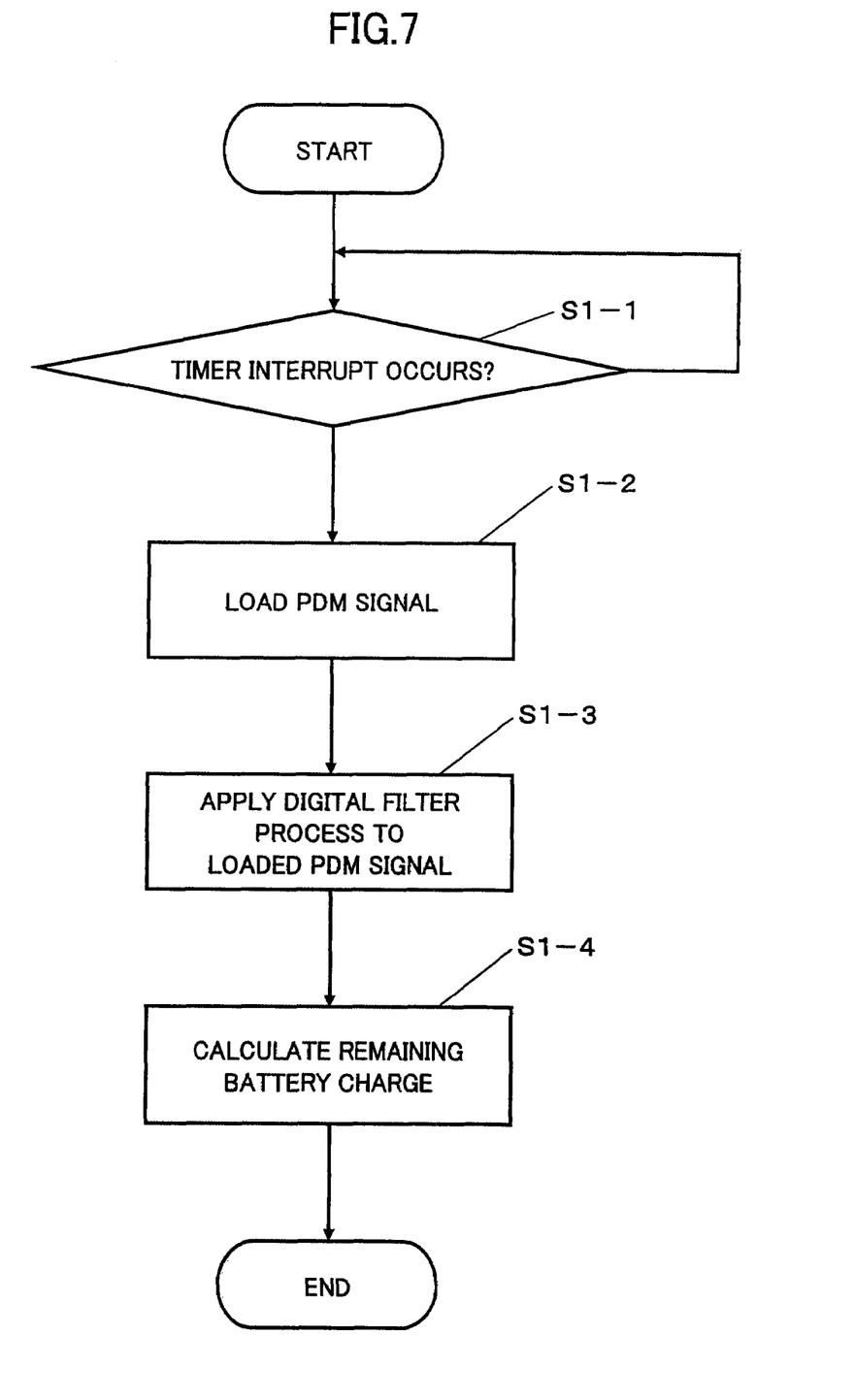
FIG. 7 is a flowchart showing processes in a CPU shown in FIG. 4.

Next, processes in the CPU 123 are described. FIG. 7 is a flowchart showing the processes in the CPU 123. The CPU 123 intermittently executes the processes so as to reduce power consumption by using a built-in interrupt timer.

First, when a timer interrupt occurs (YES in S1-1), the CPU 123 loads a PDM signal from the sigma-delta modulator 122 (S1-2). The CPU 123 generates the timer interrupt every predetermined period corresponding to, for example, an 8-bit string of the PDM signal (for example, every 1 ms).

Next, the CPU 123 applies a process corresponding to the digital filter processing program 147 to the loaded PDM signal (S1-3). With this, the PDM signal loaded from the sigma-delta modulator 122 is converted into PCM data (multi-bit digital value).

At this time, the CPU 123 sequentially loads the PDM signals based on the analog signals output from the voltage detecting section 131, the temperature detecting section 132, and the current detecting section 133 by controlling the multiplexer 134. Then the CPU 123 sequentially converts the loaded PDM signals into the PCM data by executing the digital filter processing program, and stores the PCM data in the memory 124.

Next, the CPU 123 calculates the remaining battery charge in the battery 101 based on the voltage values, the temperature values, and the current values (voltage values measured from current vales) which are converted into the PCM data by executing the remaining battery charge calculating program (S1-4). For example, the remaining battery charge is calculated by accumulating the current values (voltage values measured from current vales). At this time, the remaining battery charge is corrected by the voltage value and the temperature value.

[Decimation Filter Process]

Figure 8:
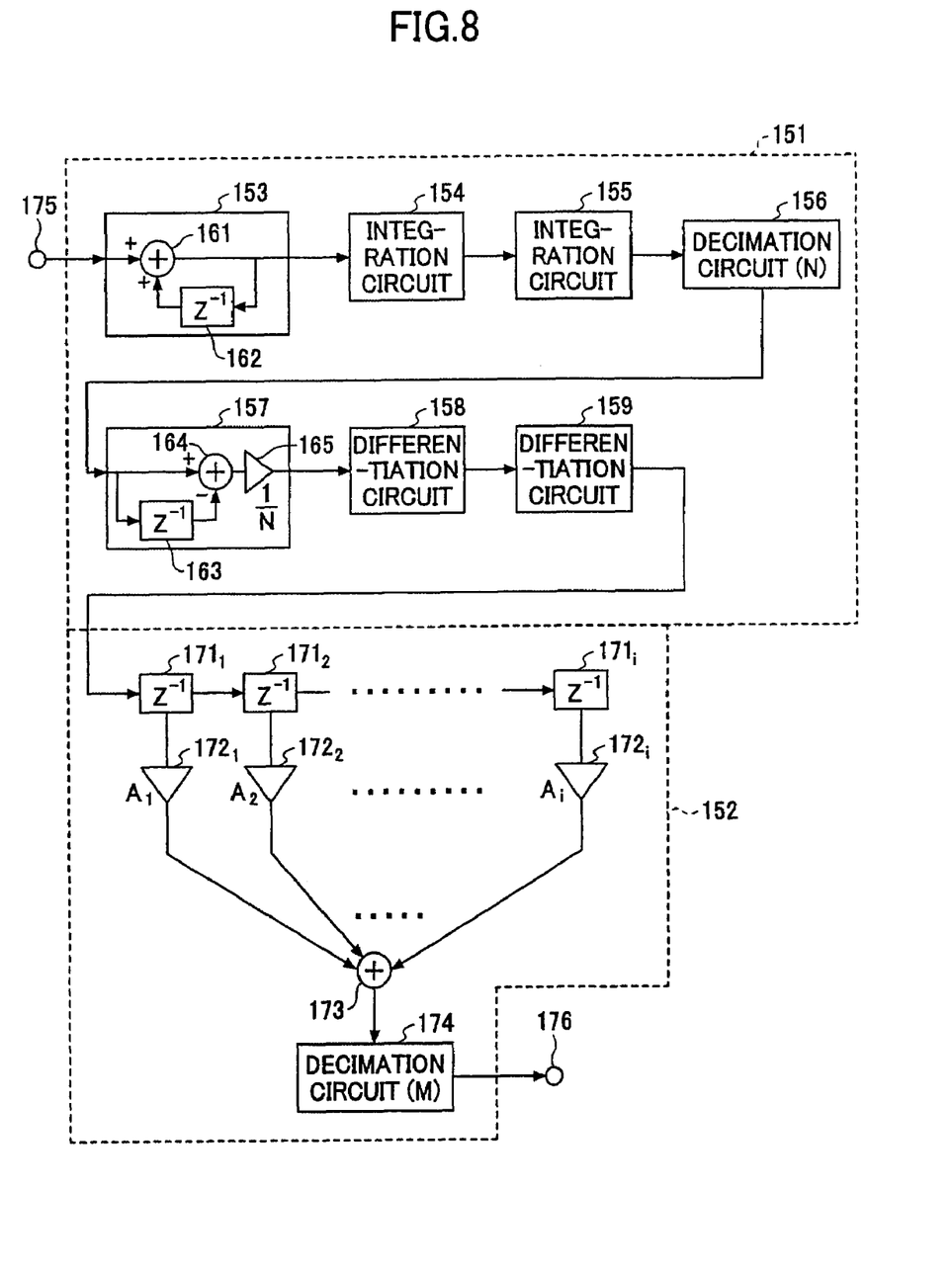
FIG. 8 is a block diagram showing a decimation filter formed of hardware.

Next, a decimation filter process is described. FIG. 8 is a block diagram showing a decimation filter formed of hardware. As shown in FIG. 8, the decimation filter includes a CIC filter section 151 and a FIR filter section 152.

The CIC filter section 151 includes three-stage integration circuits 153, 154, and 155 connected in a cascade, a decimation circuit 156, and three-stage differentiation circuits 157, 158, and 159 connected in a cascade.

Each of the integration circuits 153, 154, and 155 includes an adder 161 and a delay element 162. The adder 161 adds input data and data output from the delay element 162. The delay element 162 delays data output from the adder 161 by one sampling period and supplies the delayed data to the adder 161. Each of the differentiation circuits 157, 158, and 159 includes a delay element 163, a subtractor 164, and a divider 165. The delay element 163 delays input data by one sampling period. The subtractor 164 subtracts data output from the delay element 163 from the input data, and the divider 165 divides the data output from the subtractor 164 by N.

The decimation circuit 156 thins out data by extracting the data output from the integration circuit 155 once in N times sampling periods, and supplies the extracted PCM data to the differential circuit 157.

The PDM signals supplied to a terminal 175 are made to be PCM data by being integrated at the integration circuits 153 through 155, and decimation of N to 1 is performed on the PCM data. Further, differentiation is applied to the PCM data at the differentiation circuits 157 through 159, then, the PCM data are output.

The FIR filter section 152 includes "i" stages of delay elements $171_1$ through $171_i$ connected in a cascade, "i" stages of multipliers $172_1$ through $172_i$, an adder 173, and a decimation circuit 174. The multiplier $172_n$ multiplies a coefficient $A_n$ by PCM data output from the delay element $171_n$ (n is an integer from 1 to "i"). The adder 173 adds outputs from the multipliers $172_1$ through $172_i$.

The PCM data output from the integration circuit 155 are sequentially delayed at the delay elements $171_1$ through $171_i$ and the delayed PCM data are multiplied by the coefficient $A_n$ at the multiplier $172_n$, and the multiplied PCM data at the multipliers $172_1$ through $172_i$ are added at the adder 173. The decimation circuit 174 thins out the PCM data output from the adder 173 by extracting once in M times sampling periods (decimation of M:1). Then the PCM data produced by the digital filter process are output from a terminal 176.

The decimation filter shown in FIG. 8 formed by hardware is realized by the digital filter processing program 147 which is executed by the CPU 123.

Figure 9:
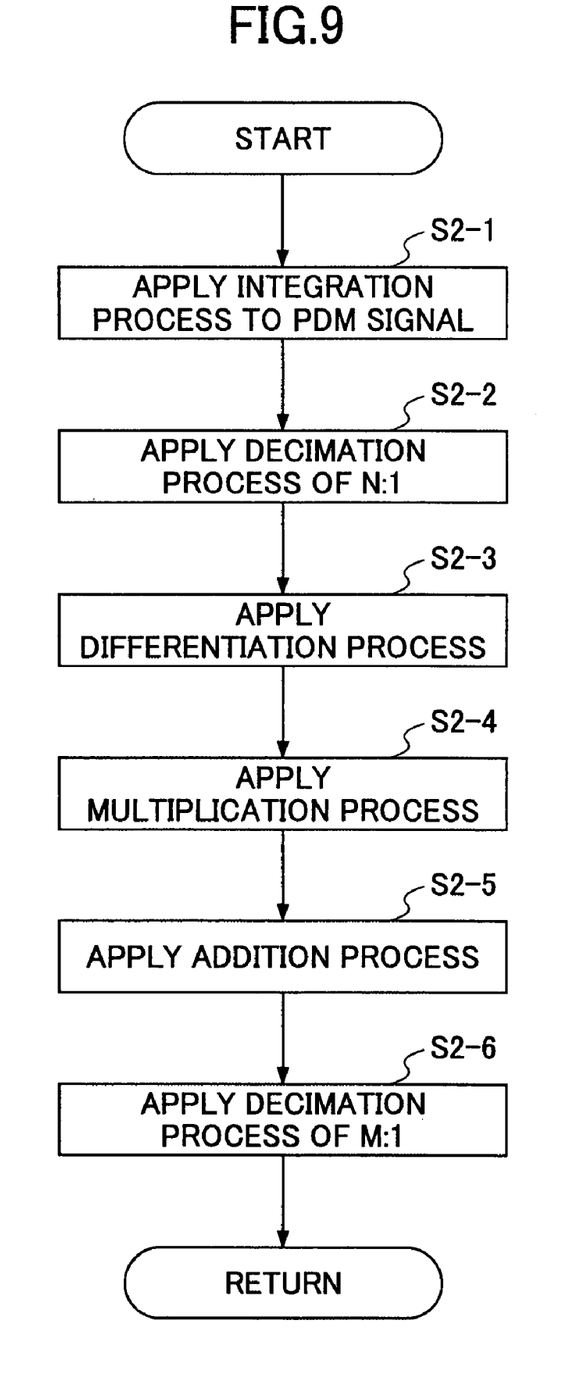
FIG. 9 is a flowchart showing a digital filter process which is executed by the CPU in step S1-3 shown in FIG. 7 in detail.

FIG. 9 is a flowchart showing the digital filter process which is executed by the CPU 123 in step S1-3 shown in FIG. 7 in detail.

First, the CPU 123 reads PDM signals of, for example, an 8-bit string from the memory 124 and performs the same integration processes as those at the integration circuits 153 through 155 to the PDM signals (S2-1). Then, a decimation process of N:1 is applied to the integrated PDM signals (S2-2). Next, the same processes as those in the differentiation circuits 157 through 159 are applied to the PDM signals, and the obtained PCM data are stored in the memory 124 (S2-3).

Further, the CPU 123 sequentially reads "i" pieces of the PCM data from the memory 124 and "i" pieces of the coefficients $A_1$ through $A_i$ stored in the memory 124 and performs the same processes as those in the multipliers $172_1$ through $172_i$ (S2-4). Next, the same process as that in the adder 173 is applied to the PCM data (S2-5), and the decimation process of M:1 is applied to the PCM data and the obtained PCM data are stored in the memory 124 (S2-6).

Figure 10:
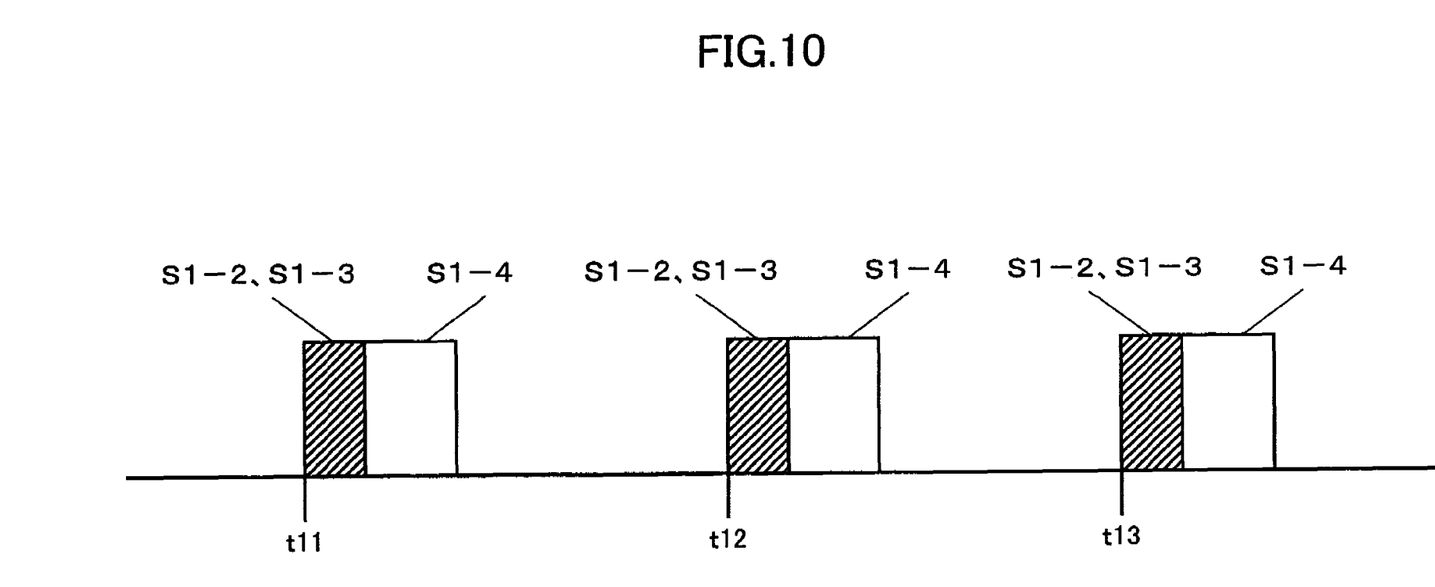
FIG. 10 is an operations chart according to the first embodiment of the present invention.

FIG. 10 is an operations chart according to the first embodiment of the present invention. In FIG. 10, time t11, t12, and t13 show the timing of timer interrupt. When the timer interrupt occurs at the time t11, t12, and t13, the CPU 123 loads a PDM signal from the sigma-delta modulator 122 (S1-2). Next, the CPU 123 performs a process corresponding to the digital filter processing program 147 to the loaded PDM signal (S1-3). With this, the analog signals from the voltage detecting section 131, the temperature detecting section 132, and the current detecting section 133 modulated into PDM signals via the sigma-delta modulator 122 are converted into PCM data.

Next, the CPU 123 calculates the remaining battery charge in the battery 101 based on the PCM data obtained in step S1-3 and the calculated remaining battery charge is stored in the memory 124 (S1-4). The remaining battery charge stored in the memory 124 is read in response to a request from an external circuit and is transmitted to the external circuit via the communication circuit 126.

According to the first embodiment of the present invention, the sigma-delta modulator 122 modulates the analog signal to be the PDM signal, and the CPU 123 performs the digital filter process on the PDM signal. With this, PCM data are obtained. That is, instead of using an A/D converter having a complex structure, the sigma-delta modulator 122 having a simple structure can be used; further, the CPU 123 can calculate the remaining battery charge of the battery 101. Since the workload for calculating the remaining battery charge is low in the CPU 123, the CPU 123 can fully execute the digital filter process.

In the first embodiment of the present invention, the detecting section 121, the sigma-delta modulator 122, the CPU 123, and the memory 124 are integrated in one semiconductor chip. However, analog circuits of the detecting section 121 and the sigma-delta modulator 122, and digital circuits of the CPU 123 and the memory 124 can be separated into two chips. The CPU 123 and the memory 124 are integrated in the fuel gage IC 111; however, the CPU 123 and the memory 124 can be separated from the fuel gage IC 111.

Second Embodiment

Figure 11:
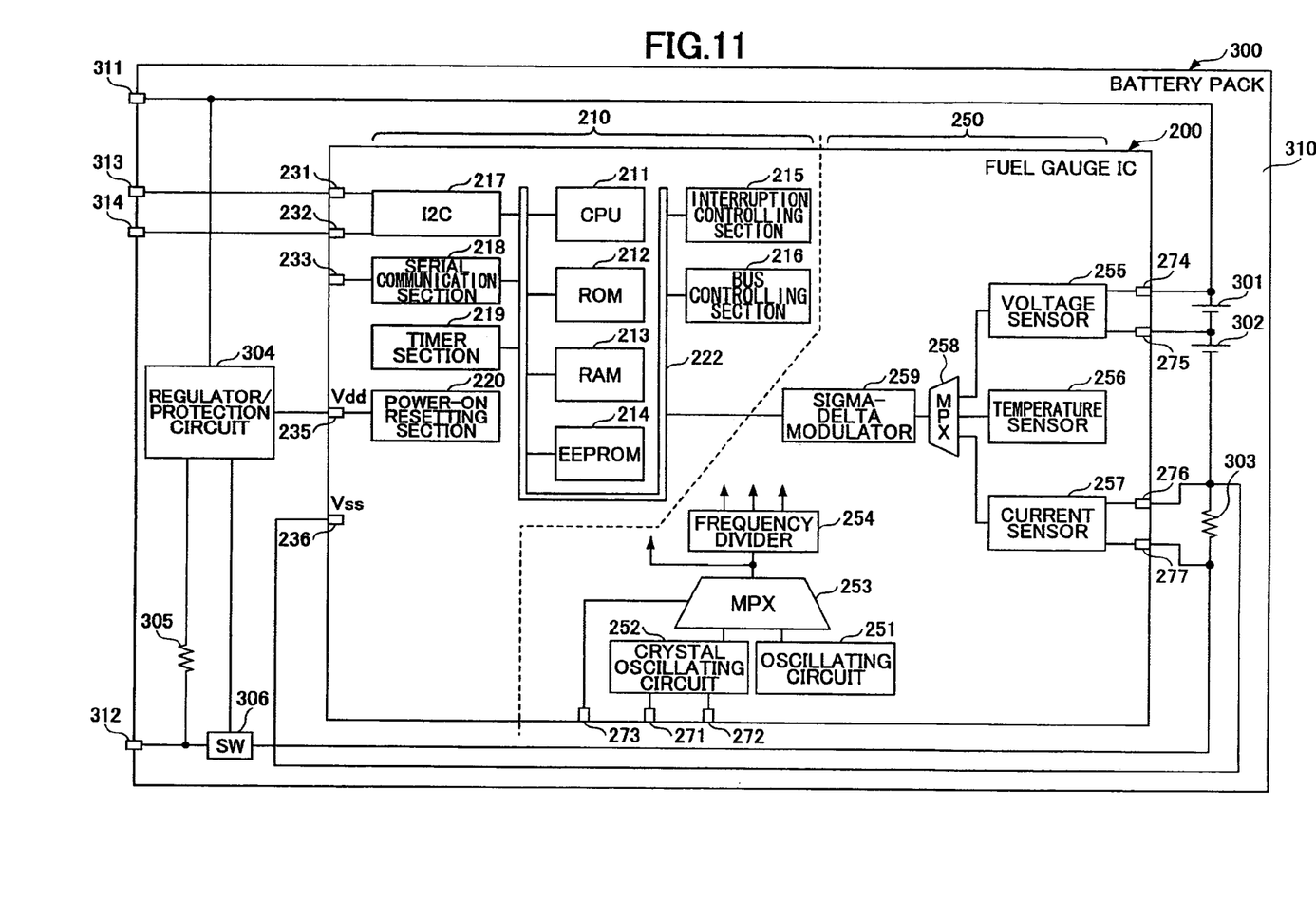
FIG. 11 is a block diagram showing a battery pack according to a second embodiment of the present invention.

FIG. 11 is a block diagram showing a battery pack according to a second embodiment of the present invention. As shown in FIG. 11, a fuel gauge IC 200 includes a digital section 210 and an analog section 250.

The digital section 210 includes a CPU 211, a ROM 212, a RAM 213, an EEPROM 214, an interruption controlling section 215, a bus controlling section 216, an I2C section 217, a serial communication section 218, a timer section 219, and a power-on resetting section 220. The above elements (sections) are connected with each other via an internal bus 222.

The CPU 211 controls all the elements in the fuel gauge IC 200 by executing programs stored in the ROM 212. With this control, the CPU 211 calculates the remaining battery charge by accumulating charging and discharging currents of a battery. At this time, the RAM 213 is used as working storage. In the EEPROM 214, trimming information and so on are stored. In FIG. 11, the CPU 211 corresponds to the CPU 123 shown in FIG. 4, and the ROM 212, the RAM 213, and the EEPROM 214 correspond to the memory 124 shown in FIG. 4.

The interruption controlling section 215 receives an interrupt request from each element in the fuel gauge IC 200 and generates an interrupt based on its priority and informs the CPU 211 of the interrupt. The bus controlling section 216 controls the internal bus 222 so that what element uses the internal bus 222.

The I2C section 217 executes two-line serial communications by being connected to a communication line via ports 231 and 232. The serial communication section 218 corresponds to the communication circuit 126 shown in FIG. 4, and executes one-line communications by being connected to a communication line via a port 233.

The timer section 219 counts system clocks and the CPU 211 refers to the counted system clocks. The power-on resetting section 220 resets all the elements in the fuel gauge IC 200 by generating a resetting signal while detecting a voltage Vdd which is supplied to a port 235.

The analog section 250 includes an oscillating circuit 251, a crystal oscillating circuit 252, an MPX (multiplexer) 253, a frequency divider 254, a voltage sensor 255, a temperature sensor 256, a current sensor 257, an MPX 258, and a sigma-delta modulator 259.

The oscillating circuit 251 is an oscillator having a PLL circuit and outputs an oscillation signal of some MHz. The crystal oscillating circuit 252 outputs an oscillation signal of some MHz by being connected to an external oscillator via ports 271 and 272. The oscillation frequency of the crystal oscillating circuit 252 is more precise that that of the oscillating circuit 251.

The MPX 253 selects one of the oscillation signals from the oscillating circuit 251 and the crystal oscillating circuit 252 based on a selection signal supplied from a port 273. Then the MPX 253 supplies the selected oscillation signal to each element including the frequency divider 254 in the fuel gauge IC 200. When the selection signal is not supplied from the port 273, the MPX 253 selects the oscillation signal from, for example, the oscillating circuit 251. The frequency divider 254 generates clocks by dividing the system clock and supplies the clocks to the elements in the fuel gauge IC 200.

The voltage sensor 255 detects a voltage of batteries (lithium-ion batteries) 301 and 302 externally connected to corresponding ports 274 and 275, and supplies the detected analog voltage signal to the MPX 258. The temperature sensor 256 detects ambient temperature of the fuel-gauge IC 200 and supplies the analog detected temperature signal to the MPX 258.

A current detecting resistor 303 is connected between ports 276 and 277, the current sensor 257 detects a current flowing in the current detecting resistor 303 based on a potential difference between the ports 276 and 277, and supplies the detected analog current signal to the MPX 258.

The MPX 258 sequentially selects the detected analog voltage signal, the detected analog temperature signal, and the detected analog current signal, and sequentially supplies the selected signal to the sigma-delta modulator 259. The sigma-delta modulator 259 converts the detected signal into a PDM signal by applying sigma-delta conversion to the detected signal. Then, the sigma-delta modulator 259 supplies the PDM signal to the CPU 211 via the internal bus 222. The CPU 211 converts the PDM signals into PCM data by performing a digital filter process. In addition, the CPU 211 calculates the remaining battery charges by accumulating the charging and discharging currents of the batteries 301 and 302. At this time, the detected temperature signal is used for temperature correction.

In FIG. 11, the voltage sensor 255 corresponds to the voltage detecting section 131 shown in FIG. 4, the temperature sensor 256 corresponds to the temperature detecting section 132 shown in FIG. 4, and the current sensor 257 corresponds to the current detecting section 133 shown in FIG. 4. In addition, the MPX 258 corresponds to the MPX 134 shown in FIG. 4, the sigma-delta modulator 259 corresponds to the sigma-delta modulator 122 shown in FIG. 4, and the current detecting resistor 303 corresponds to the current detecting resistor Rs shown in FIG. 4.

In FIG. 11, a battery pack 300 is formed by containing the fuel gauge IC 200, the batteries 301 and 302, the current detecting resistor 303, a regulator/protection circuit 304, a resistor 305, and an SW (switch) 306 in a case 310. The positive electrode of the battery 301 and the power source input terminal of the regulator/protection circuit 304 are connected to a terminal 311 of the battery pack 300, and the power source output terminal of the regulator/protection circuit 304 is connected to the port 235 of the voltage Vdd which is a power source to the fuel gauge IC 200. A terminal 312 is connected to a ground terminal of the regulator/protection circuit 304 via the resistor 305, and is connected via the SW 306 to a connection point where the current detecting resistor 303 connects with the current sensor 257 via the port 277. The regulator/protection circuit 304 stabilizes a voltage between the terminals 311 and 312 and protects the battery pack 300 when the voltage becomes a value exceeding a predetermined range by cutting off the SW 306.

In addition, a connection point where the current detecting resistor 303 connects with the current sensor 257 via the port 276 is connected to a port 236 of a power source Vss. The ports 231 and 232 of the fuel gauge IC 200 are connected to corresponding terminals 313 and 314 of the battery pack 300.

Figure 12:
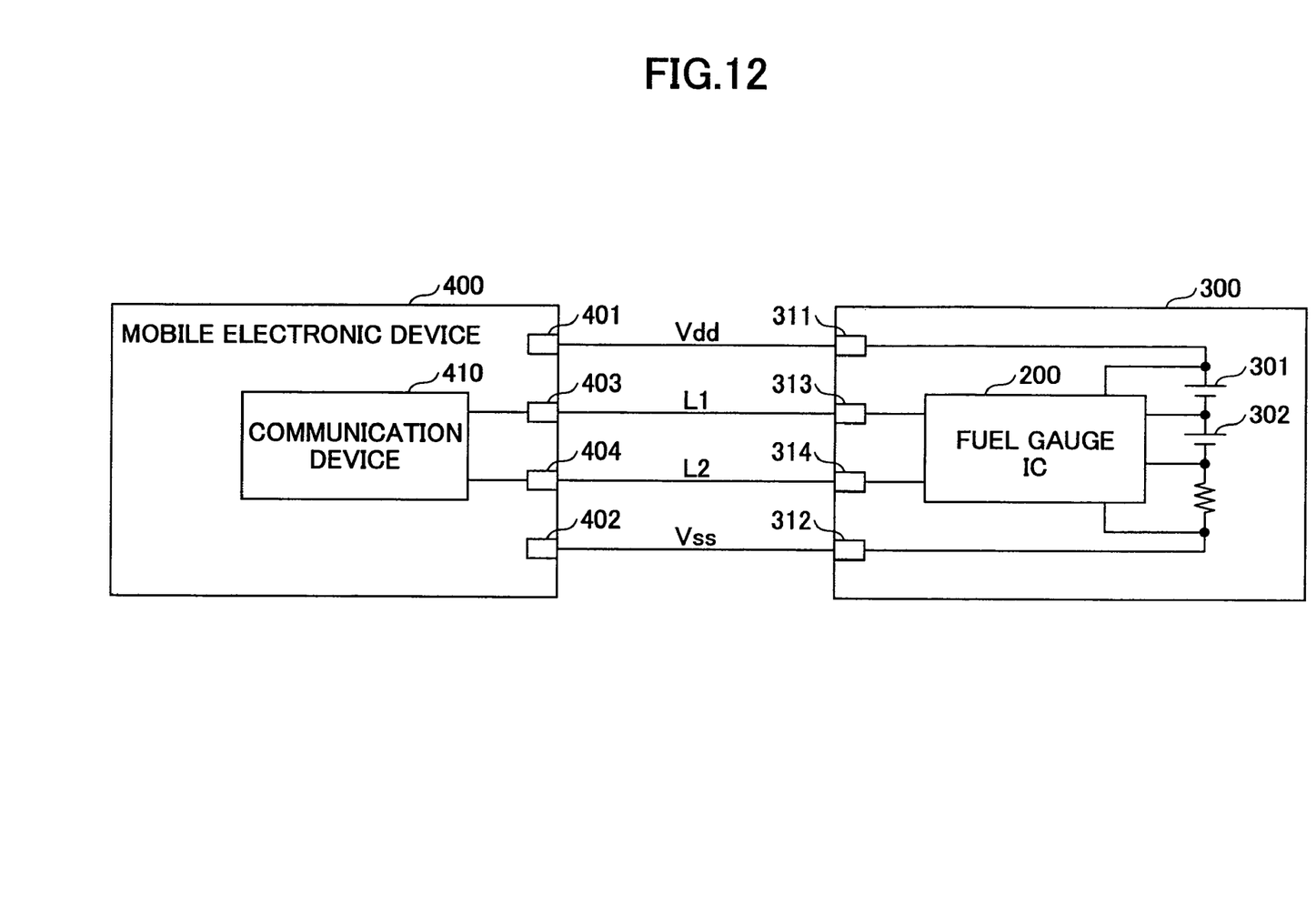
FIG. 12 is a diagram showing a connection of a battery pack shown in FIG. 11 with a mobile electronic device.

FIG. 12 is a diagram showing a connection of the battery pack 300 shown in FIG. 11 with a mobile electronic device. In FIG. 12, a mobile electronic device 400 is a mobile device such as a mobile personal computer, a digital still camera, and a mobile phone.

The terminal 311 of the battery pack 300 is connected to a terminal 401 of a power source Vdd of the mobile electronic device 400, and the terminal 312 of the battery pack 300 is connected to a terminal 402 of a power source Vss of the mobile electronic device 400. In addition, the terminal 313 of the battery pack 300 is connected to a terminal 403 of a clock line L1 of the mobile electronic device 400, and the terminal 314 of the battery pack 300 is connected to a terminal 404 of a data line L2 of the mobile electronic device 400.

In this case, generally, the mobile electronic device 400 operates as a master and the fuel gauge IC 200 in the battery pack 300 operates as a slave. In response to a request from the mobile electronic device 400, the fuel gauge IC 200 of the battery pack 300 sends the calculated remaining battery charge of the batteries 301 and 302 to the mobile electronic device 400.

Further, the present invention is not limited to the embodiments, but variations and modifications may be made without departing from the scope of the present invention.

The present application is based on Japanese Priority Patent Application No. 2006-035594 filed on Feb. 13, 2006 and Japanese Priority Patent Application No. 2007-022196 filed on Jan. 31, 2007, with the Japanese Patent Office, the entire contents of which are hereby incorporated herein by reference.

What is claimed is:

1. A battery pack, comprising:
   a battery;
   a current detecting unit which detects charging and discharging currents of the battery and outputs an analog signal corresponding to the charging and discharging currents;
   a modulating unit which modulates the analog signal to be a PDM (pulse density modulation) signal by applying a PDM modulation to the analog signal;
   a memory in which a conversion program for converting the PDM signal into PCM (pulse code modulation) data and a remaining battery charge calculating program for calculating a remaining battery charge by accumulating the PCM data are stored; and
   a CPU, which converts the PDM signal into the PCM data which are digital data by being supplied the PDM signal from the modulating unit while executing the conversion program stored in the memory, and calculates the remaining battery charge by accumulating the PCM data while executing the remaining battery charge calculating program stored in the memory.

2. The battery pack as claimed in claim 1, wherein:
   the CPU intermittently executes the conversion program, loads the PDM signal from the modulating unit, and converts the PDM signal into the PCM data.

3. The battery pack as claimed in claim 1, further comprising:
   a voltage detecting unit which detects a voltage of the battery;
   a temperature detecting unit which detect ambient temperature of the battery pack; and
   a selecting unit which selects one of analog signals detected from the current detecting unit, the voltage detecting unit, and the temperature detecting unit; wherein
   the remaining battery charge calculating program corrects the remaining battery charge by using the PCM data of the voltage detected by the voltage detecting unit and the PCM data of the temperature detected by the temperature detecting unit when the remaining battery charge calculating program accumulates the PCM data of the charging and discharging currents.

4. The battery pack as claimed in claim 1, wherein:
   the modulating unit is a sigma-delta modulator.

5. The battery pack as claimed in claim 1, wherein:
   the current detecting unit, the modulating unit, the memory, and the CPU are integrated into one semiconductor integrated circuit.

* * * * *